United States Patent [19]

Hellsten

[11] Patent Number: 4,866,446
[45] Date of Patent: Sep. 12, 1989

[54] METHOD FOR RADAR MAPPING AN AREA AND A RADAR EQUIPMENT TO CARRY OUT THE METHOD

[76] Inventor: Hans O. Hellsten, Palmaers gata 6, S-582 49 Linköping, Sweden

[21] Appl. No.: 893,294

[22] PCT Filed: Nov. 27, 1985

[86] PCT No.: PCT/SE85/00490
§ 371 Date: Jul. 24, 1986
§ 102(e) Date: Jul. 24, 1986

[87] PCT Pub. No.: WO86/03305
PCT Pub. Date: Jun. 5, 1986

[30] Foreign Application Priority Data

Nov. 28, 1984 [SE] Sweden .................. 8406007

[51] Int. Cl.[4] .................................. G01S 13/90
[52] U.S. Cl. .............................. 342/25; 342/201
[58] Field of Search .............. 342/22, 23, 24, 75, 342/201, 25

[56] References Cited

U.S. PATENT DOCUMENTS

| | | | |
|---|---|---|---|
| 4,008,469 | 2/1977 | Chapman | 342/22 |
| 4,041,489 | 8/1977 | Lewis | 342/201 |
| 4,218,678 | 8/1980 | Fowler et al. | 342/22 |
| 4,355,311 | 10/1982 | Jain | 342/25 |
| 4,443,799 | 4/1984 | Rubin | 342/201 |
| 4,450,444 | 5/1984 | Wehner et al. | 342/25 |
| 4,504,833 | 3/1985 | Fowler et al. | 342/22 |
| 4,546,354 | 10/1985 | Boles | 342/25 X |
| 4,675,677 | 6/1987 | von Maydell et al. | 342/25 |

FOREIGN PATENT DOCUMENTS 52052 5/1982 European Pat. Off.
2111792A 7/1983 United Kingdom .............. 342/25

OTHER PUBLICATIONS

"Coherent Doppler Tomography for Microwave Imaging," D. L. Mensa et al., Proceedings of the IEEE, vol. 71, No. 2, pp. 254-261, Feb. 1983.
Hans Hellsten and Lars Erik Andersson, "An Inverse Method for the Processing of Synthetic Aperture Radar Data," 1987, pp. 111-124.

Primary Examiner—Thomas H. Tarcza
Assistant Examiner—Mark Hellner
Attorney, Agent, or Firm—Fleit, Jacobson, Cohn, Price, Holman & Stern

[57] ABSTRACT

The invention relates to a method for radar mapping an area and a radar equipment for wideband exploration at frequencies below 300 MHz. A large number of frequencies, for instance 1000, are distributed over a frequency band between for instance 12.5 and 200 MHz, and approximately corresponding to terms in a geometrical series but being different harmonics to a certain fundamental frequency. This is accomplished by a synthesis generator (1) coupled to a phase control device (7) and the generated frequencies are each amplified in a separate amplifier (2), the outputs of which are guided in groups to a number of antennas, tuned to different frequency bands and fewer than the number of frequencies. The reception is carried out in a similar way from the antennas with pre-amplifiers and a mixer (3) each and an A/D-converter (4) and a registration device (5). The equipment is meant to use the principle of so called synthetic aperture (SAR).

4 Claims, 3 Drawing Sheets

METHOD FOR RADAR MAPPING AN AREA AND A RADAR EQUIPMENT TO CARRY OUT THE METHOD

The invention relates to a method and a radar equipment.

One normally defines radar as working in the frequency interval about 220 MHz–35 GHz. The present invention, however, is intended to bring about an extremely wideband scanning at considerably lower frequencies. This is achieved, not by side bands of a carrier frequency but by using a series of discrete frequencies, distributed within the frequency band in question, which has an upper limiting frequency less than 300 MHz and the frequency band used is preferably 12.5–200 MHz.

For the invention the working name CARABAS ("Coherent All Radio Band Sensing") has been coined, which will be used in the following description of the invention.

The purpose for the invention is to bring about an exploration system, for which wavelengths of the emitted signal are equal to characteristic lengths of the structures to be classified by the system. It is thereby intended to achieve an optimal coupling between signal and structure, both in view of obtaining a good signal/-noise-ratio and of suppressing ambiguities associated with the periodicity of the radar signal.

These and other advantages and characteristics are obtained according to the invention by a method and a radar equipment. The equipment is then especially suitable for airborne registration and information processing according to the principle of so-called synthetic aperture radar (SAR).

According to a preferred embodiment of the invention a distribution of radio frequencies within the band in question is used, that makes the distance between two adjacent frequencies equal to a constant quotient between the frequencies, that is in geometric progression, yet approximated by using as approximated values frequencies that are exact harmonics to a certain fundamental frequency, for instance 30 kHz. To use a determined fundamental frequency makes both the generation of the frequency signals and a detection by sampling easier and makes also the problem with the coherence easier. Radar coherence is here defined as the emitted signal being long term periodic. As by normal radar, this can be expressed such that the Fourier transform of the signal is dominated by a set of discrete spectral components, which is obtained in microwave radar with only one signal generator, that is locked to a strictly periodical mode of operation. In CARABAS the relative bandwidth is so large, that this form of signal generation is not possible. On the other hand the absolute frequencies are so low, that digital methods of synthesis could be used.

In the receiver part of the equipment the "chain" is ended for each of the N different frequencies by a low-pass filter (Doppler-filter) which in airborne SAR-mode filters out the signals that correspond to the Doppler-shifts. These are, as is explained below, dependent upon the velocity and the resp. frequency. As both these variables are known, it is possible to dimension the filters very narrow-banded and thereby to reduce noise. If the expected Doppler-shift is 10 Hz one can for instance place a pass-band with a band width of 20–40 Hz centered around this frequency. To determine the amplitude and the phase one samples with at least twice this frequency. Considering the great number of filter circuits it is suitable to sample in series, at which the following A/D-converter and data registration equipment can function according to a multiplex system.

It is previously known that it is possible with the SAR-method to produce air images, which accordingly are produced at normal radar frequencies. According to the invention it is possible to make a corresponding reproduction also with other frequencies that are more appropriately tuned to the objects.

Reference is made to the monograph Skolnik: Introduction to radar systems, 2nd edition, McGraw-Hill 1981, for a description of known technology within the radar field. This book is hereby incorporated by reference into this description.

In certain cases, for instance when there is a risk of interference with local short-waves communication, some frequency intervals should be excluded from the band in question. This can be done either in the radar equipment itself or during the analysis of the registered signals. The activity will, however, in the latter case interfere with the communications of others. It is more proper to scan over the entire band with a special radio receiver and during the transmission exclude interfering frequencies.

The invention will now be explained in detail in the form of a reasoned embodiment of the invention, which is not intended to limit the invention.

FIG. 1 then shows a schematic embodiment in the form of a block diagram.

SYSTEM DESIGN

Figure 1:
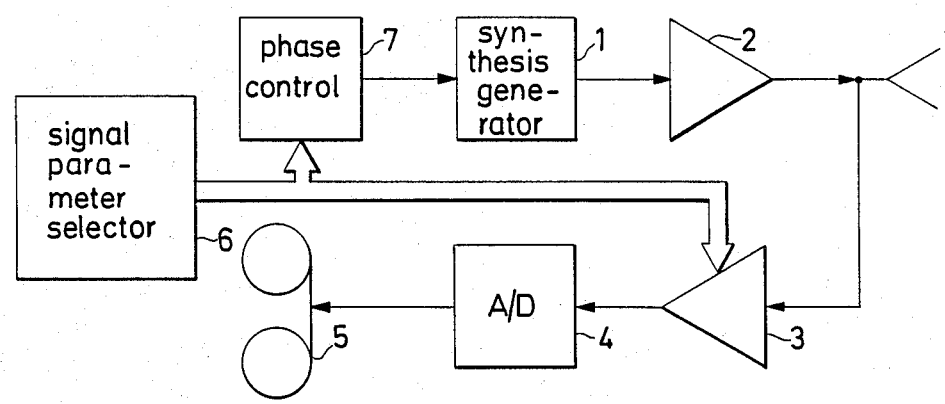

The principal design of CARABAS in a airborne SAR-mode is illustrated in FIG. 1. The system can be looked upon as a set of peripheral units-synthesis generator 1, power amplifier 2, receiver 3, A/D-converter 4 and data tape recorder 5-designed around a computer/-data bus, called signal parameter selector 6. In addition to the trivial function of opening and closing the peripheral units before and after the measuring the purpose of this unit is to:

Adapt the transmitted signal spectrum so that interference with local radio communication is avoided (the effective bandwidth can without major disadvantages be rreduced by up to some tens of MHz.

Convert parameters describing the time dependence and frequency dependence of the signal to input data for the synthesis generator.

Close the receiver during the time the transmitted effect is esssentially non-zero.

The last function has as a purpose to prevent nonlinearities to occur due to the receiver being saturated. Note, however, that the return-scattered signal is different from the transmitted by its Doppler-shift and can be separated during the following data processing in an ideally coherent linear system. Another such fundamental characteristic of coherent systems is the spectral difference of the return-scattered signal compared to white noise. Because of this difference the return-scattered signal can be separated from such noise present in the transmitter and receiver (this time also in practice). It follows that it is in many cases unnecessary to close the transmitter during the time the scattered signal is received. The actual coherent noise supression in CARABAS is discussed below.

SUMMARY OF SYSTEM PARAMETERS

CARABAS can in an example be defined quantatively by the following set of system parameters (in the following description these parameters will be analysed in more detail):

| | |
|---|---|
| non-ambiguity range | 5000 m |
| pulse repetions frequency | 30 kHz |
| nominal range resolution | 5 m |
| time bandwidth product | 1000 |
| synthetic aperture length | 12 km |
| coherence requirement | 0,01 Hz |
| azimuth resolution | 5 m |
| spectral interval, reflectivity | 0,75-12 m |
| spectral density, reflectivity | 3 mm/m |
| coherence noise suppression | −32 dB |
| information bandwidth | 48-230 kHz |
| data speed | 0,4-2 Mbit/s |

RANGE RESOLUTION

The two factors that essentially dimensions this are the non-ambiguity range and the time bandwidth product, the latter is a measure of among other things the complexity of the synthesis generator. The signal which is adapted to a specific non-ambiguity range D is given by a pulse repetition frequency c/2D (where c is the velocity of light). This is in its turn the greatest common divisor of the fundamental tone for the discrete Fournier spectrum of the radar signal. An effective definition of the product of time and bandwidth is the number of harmonics which are present in it.

Assume that the transmitted signal comprises N fixed frequencies (with known complex amplitudes). In a completely static situation, without Doppler-shift, a registration with correct phase of the received signal gives N independent equations. The complex average reflectivity within N range intervalls ca be determined from these. Thus the nominal resolution is D/N. In the case of CARABAS the smallest acceptable unambiguity distance would be about 5000 m, in view of the demand for surface covering capability among other things. Accordingly the pulse repetition frequency becomes 30 kHz. Further, 1000 fixed frequencies are with the present technique a realistic limit for the complexity of the synthesis generator, which gives a nominal resolution of 5 m. In any case a large number of frequencies, over 100, should be used, and even very large numbers could be used without deviating from the principle of the invention.

AZIMUTH RESOLUTION IN THE SAR-MODE

In a SAR-system a nominal azimuth resolution can be achieved which is half the real antenna aperture. In the example the antenna aperture is half the longest wavelength 24 m (which is consistent with the demand for a lossless antenna), so the nominal resolution becomes about 5 m. In order to maintain this resolution within the unambiguity range 5000 m an angular resolution of 1 mrad is needed. A typical aeroplane speed of 120 m/s then means that one must be able to detect radial velocities of over 12 cm/s. The Doppler-shift is twice the quotient between the radial velocity and the wavelength. For the longest wavelength, the Doppler-shift then becomes, 0,01 Hz. We find that the time of integration is 100 s, under which the coherence in the synthesis generator must be maintained. The flying distance covered during this time is 12 km, which is the length of the synthetic apperture.

The demand for coherence agrees well with the performance of the CODAR-system that is mentioned in the following. In this it was established that the Doppler-shift corresponding to 5 cm/s could be detected at 25 MHs, i.e. it has been demonstrated with this system that it possible to maintain the coherence during 100 s also in practice.

FREQUENCY DISTRIBUTION

For SAR carried by a satellite one must consider the content of harmonics in the radar signal, so that the harmonics do not mix due to Doppler-broadening. For radio frequencies and airborne SAR, however, this broadening is less than 30 kHz, that is the smallest possible frequency separation between the harmonics, so there does not exist any principal restrictions in this case. In an embodiment of CARABAS it is, however, also desirable that the received signal can be separated from white noise in the receiver and transmitter. To what extent such a noise suppression can be done depends on how much less the Doppler-broadening is than the actual frequency separation.

The choice of the band interval 200–12.5 MHz is a trade off between the demand for maximally multispectral information and antenna performance considerations. It is natural to locate the discrete frequencies within this interval in such a way as to approximate a geometrical series. This means that the spectral distribution of the reflectivily function in CARABAS is estimated with an accuracy that depends uniformly upon the wave number. A frequency distribution of this kind is given by a progression faction n, that expresses the relative separation between the frequency components. Thus we get $$12.5 \, (1+n)^{1000} = 200$$

which gives n=2776 Hz/MHz. Please note that the frequency distribution is only approximatly defined by this factor. The frequency components must be represented by those exact harmonics of 30 kHz which are closest to the geometrical series. Please also note that certain frequency intervals, depending upon the measuring occasion, may be excluded if there is a risk of interference with local short-wave communication. The progression factor n can be expressed in the spectral density, with which the reflectivily function is estimated. For CARABAS this density is 3 mm/m.

The aeroplane speed 120 m/s means that the Doppler-broadening corresponds to speeds lower than 240 m/s. The relative Doppler-broadening thus becomes 1.6 Hz/MHz. The noise suppression for a geometrical frequency distribution can be characterized with the frequency independent ratio between the Doppler-broadening and the frequency distance. For CARABAS this ratio becomes 1.6/2776= −32 dB.

SAMPLING FREQUENCY IN SAR-MODE

The information bandwidth for CARABAS is considerably lower than the signal bandwidth 190 MHz. Two ways of defining the information bandwidth leads to an upper and a lower limit for the sampling frequency needed. A more detailed definition of the sampling frequency needed calles for a closer analysis.

A lower limit for the sampling frequency is obviously given by the number of resolution cells which per time unit passes abeam the aeroplane. With the assumed values on azimuth resolution aeroplane speed and number of resolution cells in the range direction, the flow 24,000 resolution cells/s is obtained. Each element of resolution corresponds to a unknown complex value of reflecitivity, so in order to have all these defined by measuring data, real samples have to be taken at least with the frequency 48 kHz.

An upper limit for the sampling speed is obtained from the following discussion. the Doppler-broadening corresponds to speeds lower than 240 m/s. For the lowest frequency 12.5 MHz the maximal Doppler-broadening then becomes 20 Hz. For each following higher frequency component the Doppler-broadening increases in proportion to the frequency, i.e. geometrically with the progression factor 0.002776. The maximal information bandwidth is the sum of these Doppler-bandwidths of all the 1000 frequency components. The well known formula for the sum of a geometric series gives the information bandwidth 115 kHz, which means that real samples must be taken with the frequency 230 kHz at the most.

The received signal is suitably stored in logarithm form after a transformation, at which 8 bits (one character) dynamics per sample should be enough. The information speed is then in the region of 0.4–2 Mbit/s. As a comparison it may be mentioned that measuring data from SEASAT were transmitted with a speed of 100 Mbit/s. The flow of resolution cells passing by SEASAT was 6 millions of cells/s. This transmission speed corresponds approximately to the lower limits of sampling and information velocities in CARABAS. The comparison indicates that the registration of the data hardly could become a problem. Conventional data tapes stores 1600 characters/inch. Thus band speeds between 30 and 150 inch/s are needed for the data-registration. The lower speeds are available even in the form of simple data tape recorders.

SYNTHESIS GENERATOR

The uniformly frequency divided, very broadband signal which is defined above can probably not be achieved with conventional methods of generation of coherent radar signals. It is, on the other hand, quite possible to generate such a signal with digital methods, which will be discussed here.

Figure 2:
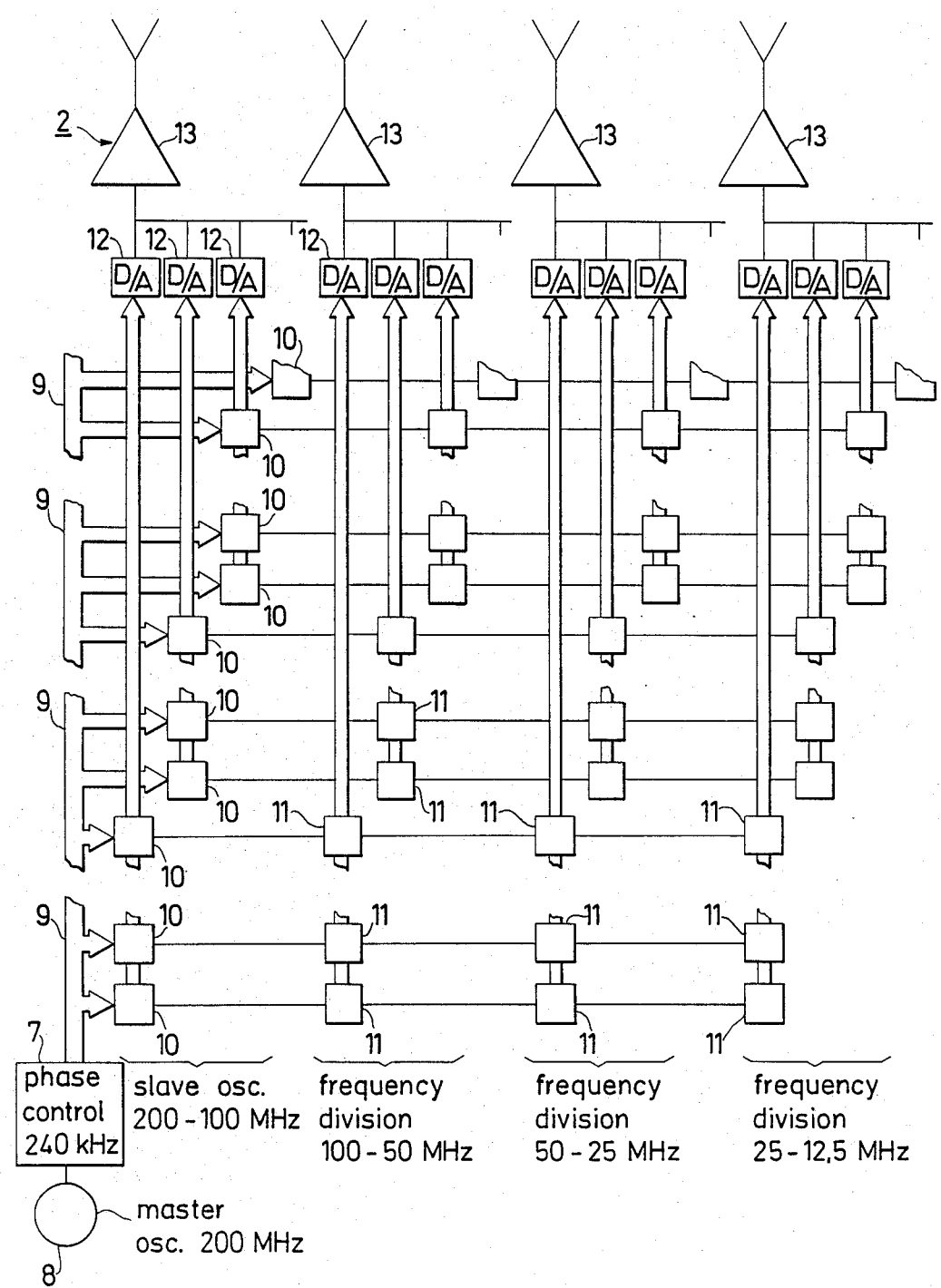
FIG. 2 shows a synthesis generator with transmission amplifiers and antennas.

The design of the synthesis generator is based on ECL-logic, with which switch frequencies up to 400 MHz are possible. An example of the principal design of the generator is given in FIG. 2. As is evident from the figure, the generator is controlled by a master oscillator 8. This controls, via a data bus 9 (called phase control bus), a number of freely oscillating flip-flops 10 (called slave oscillators). In the example 250 such flip-flops are needed, all of which representing a harmonic to 240 kHz in the frequency interval 200-100 MHz. The digitally modulated signal produced by each flip-flop is further frequency divided by flip-flops 11 in the steps 1:2, 1:4, 1:8, at which the 1000 evenly distributed harmonics to 30 kHz are represented in the network of the generator. The outgoing signal is achieved by adding the instantaneous digital phase state in appropriate multiplets of points in the network and transform it into an analog signal. If the digital addition takes place in octets of points 125 parallelly working 8 bits D/A-converters 12 are needed. The signals from these are taken to a distributed power amplifier 2 with amplifiers 13. As all amplifiers possess a well defined, sufficiently narrow passband, digital harmonic noise can be filtered away.

It is required that the slave oscillators only drifts a fraction of a period between two resets—Lets say 1/10 of a period. The higher the reset frequency is, the lower the demand for frequency stability of the slave oscillator is. The frequency with which all slave flip-flops can be reset is the greatest common divisor to the natural frequency of the flip-flops, e.g. 240 kHz. It follows that the relative frequencystability of the slave flip-flops has be be about 0.0001 (1:10$^4$).

RECEIVER

Figure 3:
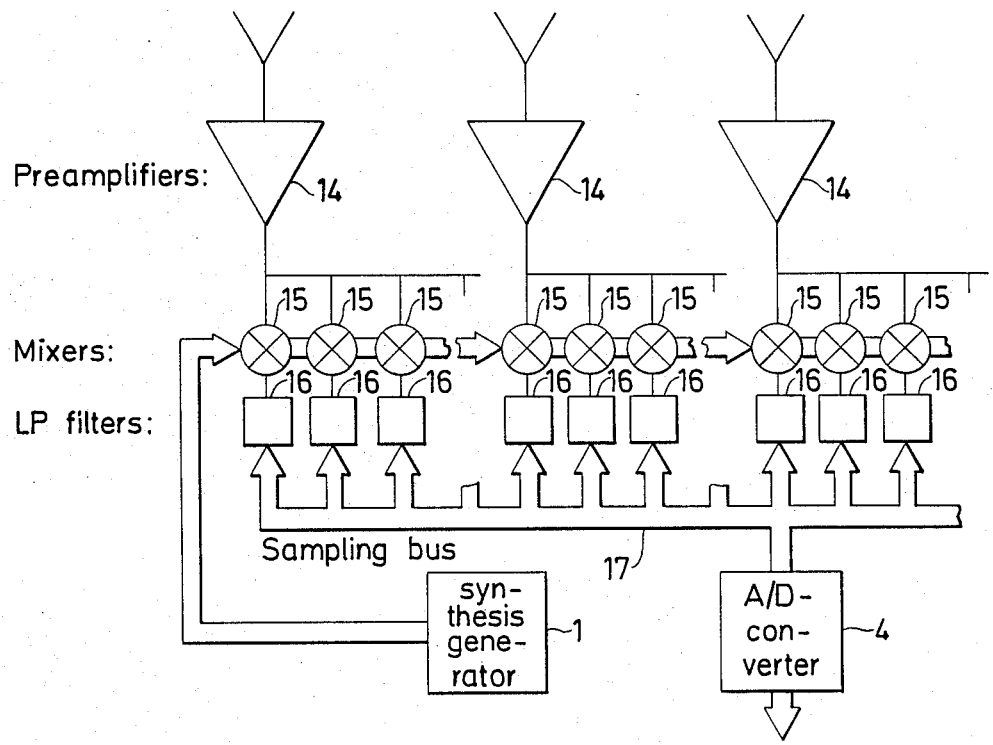
FIG. 3 shows a receiver.

The comparatively moderate data storage rate requires the receiver to be inherently narrow banded by being adapted to the expected spectrum of the return signal. This is for instance possible with a receiver design according to FIG. 3, which is almost reciprocal to the design of the transmitter. The receiver comprises a set of pre-amplifiers 14 that together covers the frequency interval 12,5-200 MHz. The signal, in this way amplified and partly frequency distributed, is then down converted in the mixer unit 15 by means of frequencies from the transmitter network 1. Please note that this preliminary frequency distribution must be fine enough (in other word at least four pre-amplifiers 14 must be used) in order to avoid problems with harmonics. The mixer products are low-pass filtered to the expected Doppler-broadening of the respective transmitted spectral component. Thus the information carrying part of the received signal is represented in the output of the 1000 low-pass filters 16 and can there be sampled with the previously deduced frequency. The sampling is controlled by a data bus 17, which, when needed, only samples a selection of outputs. This can be desirable when signals from outer sources of interference (e.g. communication radio) are found in certain outputs.

THE ANTENNA IN AIRBORNE SAR-MODE

Above the reasons based on the applications to use low frequency signals in coherent radio has been described briefly. More reasons will be given below. A lower limit for the frequency content of the radar signal is, however, put by the dimensions of the antenna. In airborne applications this lower limit is given by the characteristic dimensions of the aeroplane. Specificly in SAR-applications the situation is a little more complicated as the lower limiting frequency, via the dimension of the antenna, also have an effect on the azimuth resolution (as mentioned above the resolution is about ¼ of the corresponding wavelength). With microwave SAR no attempts to try to approach this wavelength dependent limit of resolution has been done, and is probably not practical.

For CARABAS the azimuth resolution is optimized with respect to the lower limiting frequency. As will be explained it has in the example been choosen so that the dimensions of a lossless antenna are not larger than to allow azimuth resolution just as good as with microwave SAR. The dimensions are also such that the antenna system may be carried by a small aeroplane. The azimuth resolution 5 m according to the example is achieved with an antenna aperture which is half the longest wavelength, that is 12 m.

Even if it is not quite true that the absolute bandwidth determines the nominal range resolution, the bandwidth is still a essential measure of radar performance. If for instance the coherent noise suppression is fixed to a certain given value, the bandwidth is directly related to the nominal range resolution. The bandwidth also determines the capability of the radar in to estimate spectral reflectivity characteristics. As for the lower frequency limit, the bandwidth is limited mainly by reasons of antenna performance. The band interval 200–12,5 MHz seems to be what reasonably can be obtained with an airborne antenna system.

Figure 4:
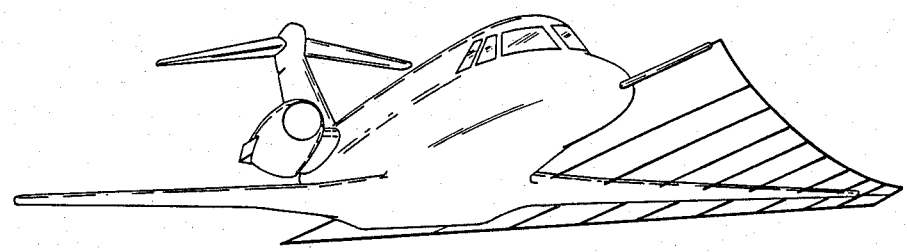
FIG. 4 shows schematic and aeroplane fitted with antennas.

The antenna directivity vertically and laterally imposes further restrictions on the antenna configuration. As the aperture distance in the example is 12 km and the unambiguity distance is 5 km, the antenna beam must have an effective lateral width greater than 90 degrees. This does not have an injurious effect on the synthetic antenna gain. It is, however, necessary to have a narrow beam in vertical direction. Above all the forward/backward beam ratio has to be high in order to avoid ambiguities, preferably better than 20 dB. A possible antenna configuration, both with respect to bandwidth and directivity, is a log-periodic antenna suspended from the structure of the aeroplane according to the sketch in FIG. 4. From a log-periodic antenna the radiation of a certain wavelength is emitted from the antenna element that is in the best way tuned to this wavelength. The antenna is designed so that the aeroplane structure has an influence on the antenna characteristics in a minimal way and in the same way for different wavelengths. According to the figure the lowest frequencies are emitted from elements lying under the fuselage, the intermediate frequencies along one wing and the highest frequencies from an antenna part lying outside the wing tip.

Figure 5:
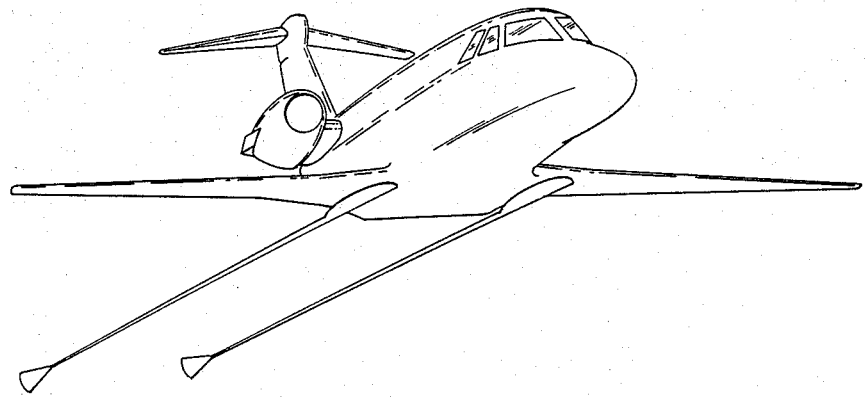
FIG. 5 shows schematical an aeroplane fitted with another type of antennas.

Another possible antenna configuration consists of two wideband antennas, for instance wideband dipoles according to the sketch in FIG. 5. The dipoles are fastened under each wing and are dragged after the aeroplane. The distance between the antennas are about 3 meters and they are about 12 meters long. The antennas are stabilized with aerodynamic cones, in the same way as fuel pipes are stabilized during air refueling of aeroplanes.

The radar pulses can be emitted and received by the same antenna, which is changed from pulse to pulse. Another way is to feed one antenna with a signal S1 and the other at the same time with a signal S2, after which the reflected signal i received by both antennas separately. During the next pulse emission the feed to the antennas is shifted. Both these solutions gives two different registrations of the ground. Thereby it becomes possible to separate the radar returns from the right and left side of the aeroplane, in spite of the fact that the registration from only one antenna is insufficient.

The invention differs, then, from existing radar systems by the low frequencies with which the system works, and most of all by the extremely large relative bandwidth. The large relative bandwidth makes new methods of signal processing of registered radar data necessary. Conventional SAR-image processing presupposes that the relative bandwidth is narrow. With the present large bandwidth a tomographic method of inversion for the signal processing is needed. The concept of carrier frequency has no relevance at all for such a system. The bandwidth 190 MHz according to the example means that the system gives a resolution in range that equals the non-speckle induced resolution of the microwave-SAR (carrier frequencies over 1 GHz). The lower frequency 12.5 MHz has been choosen so that the dimensions for a lossless antenna are not larger than to make it possible to obtain a 2-dimensional resolution that is just as good as with microwave-SAR. The dimensions are also such that the antenna system can be carried by a small aeroplane with good flying economy, for instance in the way that is defined in FIG. 4.

The concept of resolution in the simple wavelength independent meaning it has been used here is of limited value. In practice the frequency content of the emitted radiation determines to a great degree the applicability in different measuring situations for the radar. For CARABAS the absolute bandwidth is kept, while the frequencies are about one hundred times lower than for microwave radar. The most important reasons for using these low frequencies will now be stated in more detail.

CARABAS-TECHNICAL/SCIENTIFIC MOTIVATION

CARABAS is characterized in that the wavelength of the emitted signal is equal to charcteristic lengths of the structures the system shall classify. This means an optimal coupling between signal and structure both with respect to (in a broad sense) the signal/noise ratio and the suppression of ambiguities associated with the periodicity of the radar signal. Due to the extremely large relative bandwidth in CARABAS this optimal coupling can be maintained for structures and measuring objects that differs greatly from each other. The consequences of this system philosophy will now be discussed in more detail with respect to:

speckle and information in radar images,
  mapping of subterrestrial structures,
  classification of sea-states.

Speckle appears during radar imaging with monochromatic or coherent signals. For each discrete frequency component in such a signal, the stochastic variation in the complex reflectivity are totally random from image pixel to image pixel, if the roughness on the average exceeds half a wavelength. For a coherent signal the radar returns are the sum of the returns for each discrete frequency component. For each pixel this sum is then given from a set of stochastically oriented vectors in the plane of complex numbers. In the case the roughness exceeds half a wavelength within the entire bandwidth the phase of the resulting vector varies completely randomly over the image. The speckle is then said to be fully developed. In this case the image can only be modulated by the envelope of the stochastic fluctuations in the modulus of the return.

In the case of not fully developed speckle there are two information carrying quantities (modulus and phase) distributed over the image. As the information content of the return signal in this way increases, the speckle-noise can be considerably reduced with the help of the continuity which a defined phase walk between the pixels means.

It follows from what has been said that the radar images of the natural ground obtained with microwaves hardly can be obtained in another way than as speckle envelopes. This means for instance that the practical linear resolution in the SAR system is several times lower than the size of the individual image element. On the other hand according to the invention the non-ambiguity distance for the fine-scale topography is 12 m (half the wavelength for 12.5 MHz), which in most cases is less than the roughness within each image element for natural ground. Consequently the radar image can be phase-modulated with this system, with the increase of the significance of each independent pixel this method means.

The emitted radar signal is in principle returned by every discontinuity in the dielectrical properties of the space. Thus it is possible to receive reflexes also from discontinuities lying beneath the ground, in addition to those from the firm ground contour. The circumstances under which this is possible are essentially due to the properties of the ground as measured by the wavelength of the emitted radar signal. More precisely:

A. For subterrestrial structures to significantly contribute to the radar return it is necessary that the surface itself contributes relatively little. From this follows that the ground surface within each pixel has to be essentially plane compared with the wavelength.

B. The radar radiation penetrates the ground to a depth between a fraction of a wavelength and a few wavelengths. Only under extremely dry ground conditions an essentially greater penetration depth can be obtained.

Whereas A and B gives the extreme restrictions of the applicability of the microwave radar for subterrestrial observations, this is not the case for observations made with a radar system based upon meter waves. On the one hand the demand for plane ground is almost always met. On the other B means that even for normally moist ground one can expect an effective penetration of about several meters within the radio frequency spectrum.

It has also according to previously known technique been practically possible to design a so called georadar to be used under the ground surface. In Sweden such systems are used by the Institution for Technical Geology in Lund and by Swedish Geological Company (SGAB) in Uppsala. Both systems are of a incoherent pulse type. SGAB works in the frequency interval 10–50 MHz and has a range in bed-rock up to 100 m. That coherent technique and especially SAR can be used in high-resolution reproduction of subterrestrial structures was verified by the Space Shuttle experiment SIR-A over the Sahara desert. The desert environment fulfils the extreme demands of dryness and evenness that is necessary in order to use microwaves in this connection. There is every reason to expect that a radiofrequency SAR-system according to the invention can be used for underground exploration under much more general environmental conditions.

Oceanography is one of the most promising applications of radar technique in remote sensing. The coupling between the kinematics of the sea surface and radar reflectivity is suitably analysed spectrally. As a simple but very coarse approximation, the reflectivity for a certain given discrete frequency component of the emitted radar signal is proportional to the spectral component of the sea surface with twice the corresponding wave number. By illumination of the sea surface with centimeter waves, the return depends, for instance, upon the capillary wave structure of the sea surface. As a correction to this so called Bragg-scattering, also non-linear coupling terms appears, which depends both upon the presence of capillary waves and large scale wave phenomena. The exact mechanisms behind these couplings are complex and hard to master, which is well known from an extensive litterature. Yet it is due to these, that it is possible at all to observe gravitational waves of not nearly-capillary wave nature with microwave radar. Among others D. Gjessing of NTNF in Norway has used coherent microwave methods to classify sea-states and used the Doppler-shift together with dispersion relations to increase the spectral resolution in the measuring. In the same way sea-states create (mainly due to large-scale variations in the capillary wave pattern) an intermodulation in the reproduction of the sea surface with microwave-SAR, which is very evident in the images registered by SEASAT (the first SAR equipped satellite).

Due to the compliated coupling between the large-scale surface phenomena and microwaves, it is obvious that, it is only possible to obtain a very qualitative descriptions of sea-states with these. The scattering of radio frequency electromagnetic waves is a more stable basis for quantitive measurements. Bragg-scattering from gravitational waves of radio frequent radiation has been used by D. Barrick in the CODAR-system. This system measures the Doppler-shift at a discrete frequency (25 MHz) in two antenna positions. Starting from the dispersion relation for free gravitational waves the system can by that map the sea currents.

According to the above principles the signal is returned according to the invention by Bragg-scattering of the sea wave spectrum within the wavelength interval 0.75–12 m. Longer wavelength effect the return through non-linear couplings, in the same wave as in microwave radar (yet with the difference that these couplings do not involve the unstable and short-lived capillary waves). The abovementioned dispersion relation can be used to separate returns from different parts of the 2-dimensional sea-wave spectrum in the received 1-dimensional signal spectrum. It is therefore natural to expect that large parts of the total sea movements can be mapped by means of CARABAS in a much more precise way than is the case with microwave SAR.

The following enumeration underlines the potential capcity of the invention to give multilayer information. The invention can from only one measurement give information about the vegetation canopy, as well as the earth-layer and the bed-rock. This is possible due to the large relative bandwidth, within which the different spectral components have completely different penetration and scattering properties. Thus multilayer information is obtained (at the cost of reduced nominal resolution in each layer) by filtering the received signal with suitable pass-bands in the subsequent processing.

ICE-MAPPING

Classifying ice with respect to age, thickness and surface structure. Analysis of fractures in the ice through the phase-anomalies in the reflectivity function associated with these. Discovery of small deep lying icebergs (growlers) through the difference in reflectivity of the radiation for ice and water. Sea clutter can then be suppressed through spectral subtraction of dispersion relations for sea-waves.

TOPOGRAPHIC MAPPING

For the same reasons that makes the invention especially suitable for exploration of subterrestrial structures, the systemm makes it possible to explore and determine the firm ground contour in forrested areas. This makes for instance topographic mapping possible in areas where the vegetation is too extensive for photogrammetrical methods to be usable.

ECONOMIC MAPPING

Due to the penetration of the radio frequent radiation into the vegetation and ground layers the radar return according to the invention becomes dependent upon the intrinsic dielectrical conditions in these layers. The invention can therefore be used (with varying degree of precision and unambiguity) to estimate the environmental parameters that are characteristic for these layers. Parameters that primarily can be estimated concerns the moistness above and below the ground, and the biochemical composition of the ground-layer and vegetation canopy.

GEOLOGIC MAPPING

The reproduction of the surface structure of the bedrock, by the penetration of the radiation below vegetational and soft earth layers. This type of registration is according to the invention made in an airborne SAR-mode. In order to get a maximal penetration it is possible to use an antenna applied on or below the ground surface. In this way the inner structure of the bed-rock can be reproduced 2-dimensionally by SAR-technique based upon the movement of a dipol antenna along a bore hole. Based upon the experiencies of SGAB ranges of up to 100 m can be expected. The invention can therefore be used in ore-prospecting.

COAST SURVEILLANCE

The wavelengths that are used according to the invention lie in an interval that makes classification of ships possible through the phase relations between dominant partial reflectors (masts, bridges etc.). These reflectors have a size small enough for the scattering of the radio frequent radiation from each of them to be almost isotropical. On the other side the distance between them exceeds the smallest range of resolution in the example according to the invention. It follows that a certain type of ship can be given an essentially unique signature in terms of phase relations between the resolution cells of the ship in the radar image. As the system works coherently it is also possible to get further signatures by a Doppler analysis of the characteristics of the ship in motion. Finally spectral subtraction makes a reduction of sea clutter possible.

MILITARY APPLICATIONS

A number of such are conceivable as a direct consequence of the capacity of the radio frequent radiation to penetrate into the vegetation and ground. As an example the reconnaissance after and classification of objects under natural or artificial masks, for instance vehicles and weapon formatons under cover of woods, masked staff places, underground installations, certain mined areas etc. One should especially pay attention to the possibility to get resonant coupling between the radar signal and the specific metal structures for these objects (having a characteristic length of 0.75–12 m). For staff places, for instance, resonant coupling can occur to antennas for communication radio and also to electrical cables, tent-ropes etc. For underground structures the coupling can occur to for instance reinforcements. The list could be continued.

The above presented description of the radar equipment shows the different functional units designed as discrete units. A person skilled in the art of electronics realizes that, although such a design is possible, it is advantageous to design the equipment with intergrated circuits. Thus the synthesis generator shown in FIG. 2 can preferably be designed on the basis of one or a small number of integrated circuits comprising flip-flops and oscillators and D/A-converters. As such integrated circuits with the technique of today can be obtained custom-designed from a number of different manufactures, there is no reason to further discuss their design in detail.

I claim:

1. A synthetic aperture radar equipment SAR, for radar mapping an area at frequencies below 300 MHz with suppression of speckle and including mapping of structures concealed by dielectrical layers, the radar equipment including transmitter means, antenna means, receiver means and registration means, especially carried by an aeroplane, wherein the transmitter means comprises means to generate a number N of signals with discrete frequencies, distributed over a wideband frequency interval and which are determined as to phase and frequency in that they are different harmonics to a determined fundamental frequency, and which signals are connected in groups to a number M of power amplifiers, where M is smaller than N, in such a way that each such group corresponds to a smaller frequency interval and these smaller frequency intervals cover said wideband frequency interval essentially without overlapping, and a number M of antennas with tuning frequencies adapted to respective smaller frequency interval and the receiver means comprises a number M of pre-amplifiers, the inputs of which are connected to different said antennas and the outputs of which are each connected to a number of mixers, the sum of which are N, said means to generate a number N of mixing frequencies and the conducting of these to respective mixer, a number N of low-pass filters, the inputs of which are connected to different mixers, and a means of registration that is connected to the low-pass filters.

2. A radar equipment according to claim 1, wherein the N discrete frequencies are those exact harmonics to said fundamental frequency, which are closest to the vaues in a geometrical series $f_o(1+\Delta)^n$, where $f_o$ is the lowest frequency $\Delta$ a measure of the frequency step and n a ordinal number, which can take values between two choosen number N1 and N2, where N1 preferably is about 1000 and N2 preferably about 2000.

3. A radar equipment according to claim 1, wherein the means for generation of discrete frequencies comprises a synthesis generator (7, 8) having a highly stable oscillator (7, 8), a number of free swinging oscillators, for instance flip-flops, having different swinging frequencies corresponding to harmonics of the frequency of the highly stablized oscillator, a data bus connected between the oscillator and the free swinging oscillators to guide them to exact frequencies in relation to this, cascade connected binary devices connected to the flip-flops, said binary devices and flip-flops being connected in different combinations to a number of D/A-converters for generation of one of the N frequencies each, and the outputs of which are connected in groups to a number of power amplifiers that is less than the number N.

4. A radar equipment according to claim 3, wherein the means of registration comprises a sampling device for sampling the outputs of the low-pass filters.

* * * * *